(12) United States Patent
Carter

(10) Patent No.: US 6,969,537 B2
(45) Date of Patent: Nov. 29, 2005

(54) LUBRICATION FOR TREAD SUPPORTING RING FOR USE WITH A RIM FOR A TIRE HAVING TWO BEADS

(75) Inventor: John Darrell Carter, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 289 days.

(21) Appl. No.: 10/244,868

(22) Filed: Sep. 17, 2002

(65) Prior Publication Data

US 2004/0050472 A1 Mar. 18, 2004

(51) Int. Cl.$^7$ ............................................... B60C 17/10
(52) U.S. Cl. .................... 427/230; 152/521; 156/110.1; 508/136
(58) Field of Search ................. 152/520, 521, 152/158; 156/110.1, 115, 123; 508/136; 427/230

(56) References Cited

U.S. PATENT DOCUMENTS

| | | | | |
|---|---|---|---|---|
| 3,344,066 A | * | 9/1967 | Schiefer et al. | 508/136 |
| 3,518,188 A | * | 6/1970 | Pirson et al. | 508/136 |
| 3,610,308 A | | 10/1971 | McDonald | 152/158 |
| 3,739,829 A | | 6/1973 | Powell et al. | 152/330 |
| 3,814,158 A | * | 6/1974 | Ryder | 152/158 |
| 3,850,217 A | | 11/1974 | Edwards et al. | 152/330 |
| 4,036,765 A | | 7/1977 | Conger et al. | 252/21 |
| 4,045,362 A | | 8/1977 | Kuan et al. | 252/14 |
| 4,057,092 A | | 11/1977 | Tracy | 152/379.1 |
| 4,125,691 A | | 11/1978 | White | 521/51 |
| 4,202,392 A | | 5/1980 | Mineur et al. | 152/158 |
| 4,212,339 A | | 7/1980 | Dobson | 152/158 |
| 4,340,104 A | | 7/1982 | Kuan | 152/330 |
| 4,481,997 A | * | 11/1984 | Strader | 152/401 |
| 4,607,675 A | | 8/1986 | Patitsas et al. | 152/521 |
| 4,889,677 A | | 12/1989 | Hashimoto et al. | 264/297.5 |

FOREIGN PATENT DOCUMENTS

| | | |
|---|---|---|
| FR | 2 811 329 A1 | 1/2002 |
| JP | 6-270617 A * | 9/1994 |
| WO | WO 01/28789 A1 | 4/2001 |

OTHER PUBLICATIONS

Product Information Sheet for Dow Corning High–Vacuum Grease, 2000.*
Material Safety Data Sheet for Dow Corning High Vacuum Grease, Jan. 18, 2002.*

* cited by examiner

Primary Examiner—Geoffrey L. Knable
(74) Attorney, Agent, or Firm—John D. DeLong

(57) ABSTRACT

The present invention relates to a method of lubricating the interface between a supporting ring and inner surface of a tire for use with a rim for a tire having two beads, comprising the step of providing a lubricant on a surface of said supporting ring, said lubricant comprising at least 60 percent by weight of polydimethylsiloxane, from about 7 to about 13 weight percent of amorphous silica, and from about 7 to about 13 weight percent of hydroxy-terminated dimethyl siloxane.

8 Claims, 2 Drawing Sheets

LUBRICATION FOR TREAD SUPPORTING RING FOR USE WITH A RIM FOR A TIRE HAVING TWO BEADS

BACKGROUND OF THE INVENTION

It is often desired to provide tires for vehicles that can be operated in a deflated condition for a suitable distance at a desired speed. The purposes have been varied, ranging from a desire to eliminate a vehicular spare tire so that its occupied space could be more efficiently used for other purposes and, also, a desire to enable a vehicle to remain operable even with a punctured pneumatic tire for a suitable time or distance whether or not a spare tire is available.

In some instances, such objectives have been proposed to be accomplished by positioning a run-flat device within the tire-wheel cavity to prevent the tire, upon an appreciable loss of internal inflation pressure, from going completely flat. Such run-flat devices can be substantially rigid in nature and prevent a total collapse of the tire by supporting the tire's inner surface in its crown region in proximity of the ground contacting portion. In such condition, the tire is prevented from going flat against its rim and, moreover, substantially retains its inflated circumferential shape and enables its vehicle to continue its travel over a more reasonable distance.

U.S. Pat. No. 5,787,950 discloses a rim, supporting ring and assembly intended for mounting a tire having at least two beads. The rolling assembly is intended for use in the event of travelling when the tire inflation pressure drops abnormally with respect to the nominal pressure of use and when the inflation pressure may even be zero. Such assembly is known throughout the industry as the PAX design and which has been commercialized by Michelin. The supporting ring is made of vulcanized rubber that has been reinforced by wires or cables arranged circumferentially to within about 2°. In order to achieve the high degree of stiffness in the vulcanized rubber, large amounts of filler are used.

However, it is considered necessary to provide lubricity at the interface between the supporting ring and a collapsing tire's inner surface in order to retard or reduce an attendant potential frictional, destructive heat build up at the tire's inner surface. Accordingly, it is often desired to provide a lubricant for such interface.

SUMMARY OF THE INVENTION

The present invention relates to a method of lubricating the interface between a supporting ring and inner surface of a tire for use with a rim for a tire having two beads, comprising the step of providing a lubricant on a surface of said supporting ring, said lubricant comprising at least 60 percent by weight of polydimethylsiloxane, from about 7 to about 13 weight percent of amorphous silica, and from about 7 to about 13 weight percent of hydroxy-terminated dimethyl siloxane.

DETAILED DESCRIPTION OF THE INVENTION

There is disclosed a method of lubricating the interface between a supporting ring and inner surface of a tire ring for use with a rim for a tire having two beads, comprising the step of providing a lubricant on a surface of said supporting ring, said lubricant comprising at least 60 percent by weight of polydimethylsiloxane, from about 7 to about 13 weight percent of amorphous silica, and from about 7 to about 13 weight percent of hydroxy-terminated dimethyl siloxane.

In one embodiment, the design of the assembly comprising the rim and supporting ring are disclosed in U.S. Pat. No. 5,787,950 which is incorporated by reference in its entirety.

Figure 1:
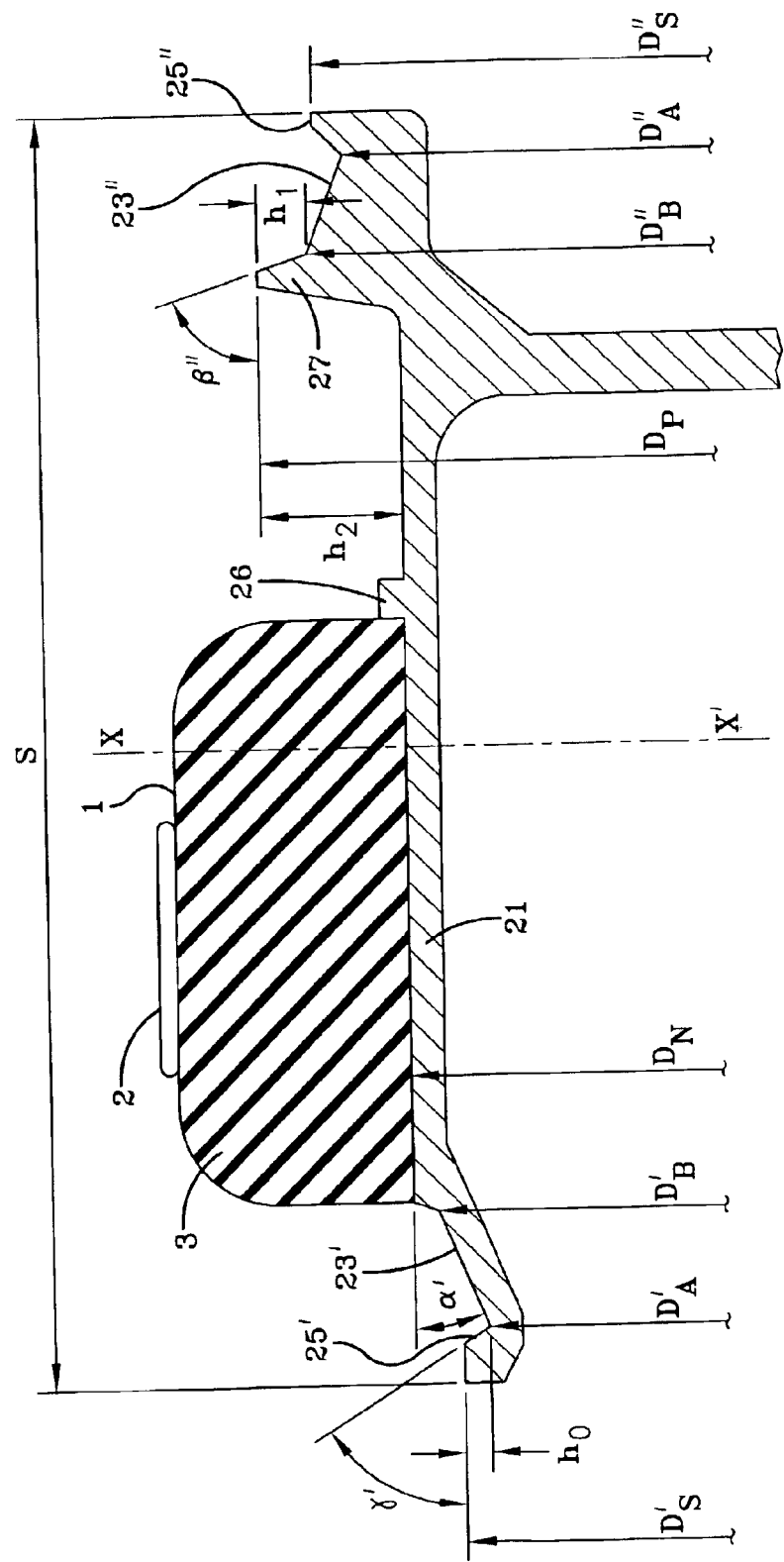
FIG. 1 shows a diagram, viewed in meridian section, of a first rim variant, according to the invention and provided with a supporting ring for the tread and lubricant disposed thereon.

One embodiment of the present method includes a rim as shown in FIG. 1, of axial width S, measured between its ends or edges furthest from the equatorial plane XX', is formed mainly by two rim seats 23' and 23" and a rim base 21, without a mounting groove. The two rim seats 23' and 23" have axially outer ends on circles, the diameters $D'_A$ and $D''_A$ of which are smaller than the diameters $D'_B$ and $D''_B$ of the circles on which the axially inner ends are located These two seats have frustoconical generatrices which form with the axis of rotation of the rim an angle $\alpha'$, which is identical for the two generatrices, of 6°. The diameter $D''_B$ of the axially inner end of the second rim seat 23" is greater than the diameter $D'_B$ of the axially inner end of the first rim seat 23'. The two rim seats 23' and 23" are axially extended on the outside, respectively by two projections 25' and 25" of low height $h_o$, equal to 3.5 mm in the example described, and respectively of diameters $D'_S$ and $D''_S$, which are smaller than the diameters $D'_B$ and $D''_B$ of the axially inner ends of the seats 23' and 23". The two projections 25' and 25" have internal frustoconical walls, said walls forming with the axis of rotation of the rim the same angle $\gamma'$, of 45°. Axially on the inside, the first rim seat 23" is joined to the rim base 21 by means of a frustoconical generatrix, the diameter $D_N$ of the cylindrical rim base 21 being slightly greater than the diameter $D'_B$ of the axially inner end of the first seat 23'. Said rim base 21 is provided with a positioning stop 26, acting, as its name indicates, to position axially a supporting ring 3 of the tread, of axial width smaller than the axial distance between the two axially inner ends of the rim seats 23' and 23" which can be slipped on directly over the first seat. Onto surface 1 of supporting ring 3 is disposed lubricant 2 of the present invention. Between the axially inner end of the second rim seat 23" and the end of the rim base 21 closest to said seat 23", there is located a protuberance 27. Said protuberance 27 has, firstly, an outer frustoconical generatrix forming with the axis of rotation an angle $\beta''$, open axially towards the inside and radially towards the outside and equal to 45°, and, secondly, an inner generatrix substantially perpendicular to the axis of rotation of the rim. "Substantially perpendicular" is intended to mean a generatrix forming with the axis of rotation of the rim an angle open axially and radially towards the outside of between 75° and 90°. The protuberance 27 has its radially outer end on a circle of diameter $D_P$, which diameter is greater than the diameter of any part located between said end and the rim edge corresponding to the seat 23", and in particular greater than the diameters $D''_B$, $D''_A$ and $D''_S$, which of the projection 25". The difference $2h_1$ between the diameters $D_P$ and $D''_B$, equal to 9 mm in the example described, is less than half the difference $2h_2$ between the diameters $D_P$ and $D_N$, $h_2$ being equal to 10 mm.

The lubricant 2 disposed on the surface 1 of the tire supporting ring 3 is a silicone grease comprising at least 60 percent by weight of polydimethylsiloxane, from about 7 to about 13 weight percent of amorphous silica, and from about 7 to about 13 weight percent of hydroxy-terminated dimethyl siloxane. In one embodiment, the lubricant is Dow Corning High Vacuum Grease.

Figure 2:
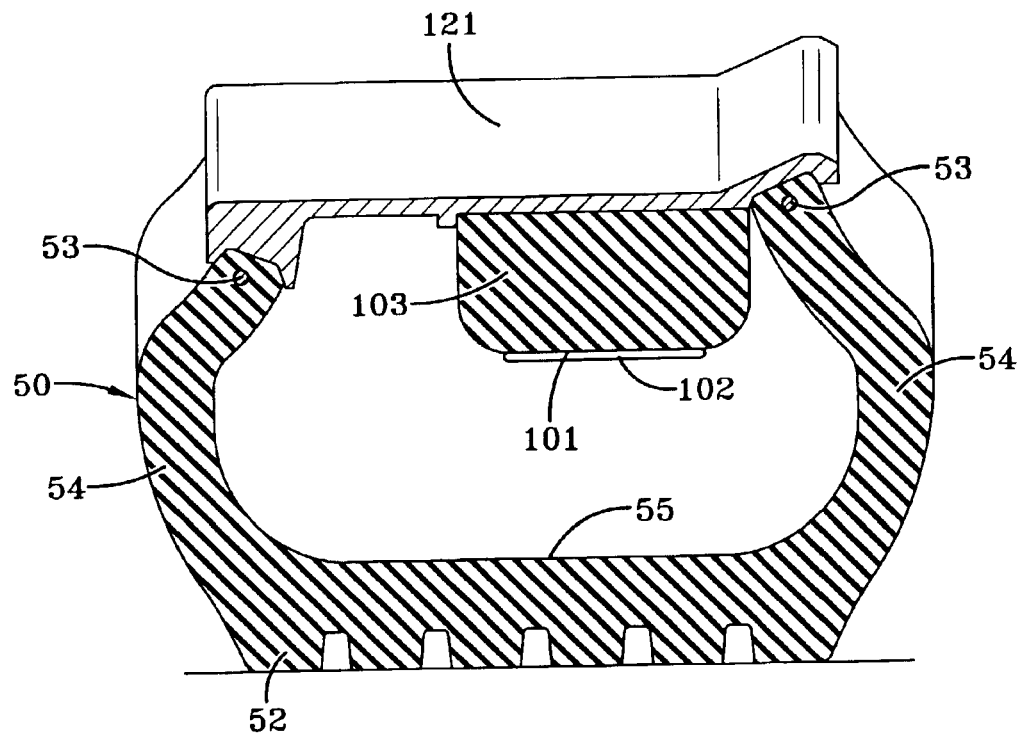
FIG. 2 shows a diagram of a run-flat tire having a support ring and lubricant, with the tire in the inflated condition.
Figure 3:
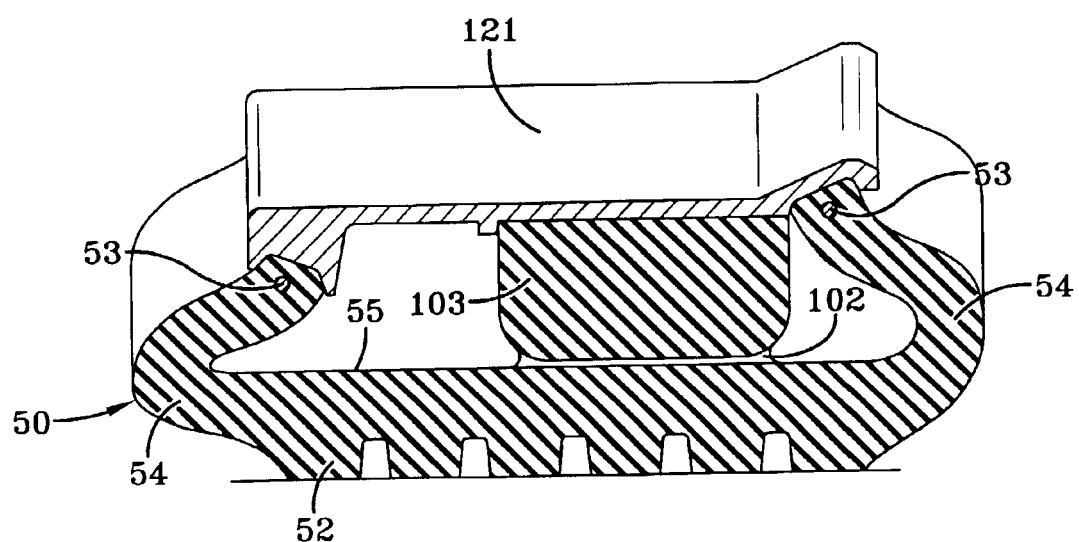
FIG. 3 shows a diagram of a run-flat tire having a support ring and lubricant, with the tire in the deflated condition.

More specifically, and with reference to FIGS. 2 and 3, it is seen that a pneumatic tire 50 is provided having a customary tread portion 52, spaced beads 53, and sidewalls 54 connecting the tread and beads, where the tire is mounted on a rim 121.

The tire/wheel assembly may also have a supporting ring 103 attached to the rim with its purpose being to provide a support to prevent the tire from going flat.

If the tire 50 is punctured, it may collapse to the extent that its inner surface 55 may come into contact with surface 101 of the supporting ring 103. Lubricant 102 is shown dispersed on surface 101 to provide lubricity during such contact. Alternatively, lubricant 102 may be disposed on inner surface 55 of the tire.

In the practice of this invention, upon experiencing a deflation, particularly due to puncturing, the lubricant of this invention provides lubricity between surface-to-surface contact areas.

The amount of lubricant utilized can vary over a relatively wide limit depending primarily upon the size of the pneumatic tire itself. For example, in a tire of the size and type HR 70×15, generally about 0.3 to about 0.8 liters is generally satisfactory. However, the desired amount will vary from tire to tire depending somewhat upon the tire size, its internal volume, its tread area and its intended use. Generally, it is desired that the fluid coating of the coolant composition has a thickness in the range of about 0.1 to about 2 millimeters.

Application of the lubricant onto the surface of the supporting ring can be accomplished by directly coating the surface with the lubricant as a film, or providing a container for the lubricant composition which is released by an activation means by the deflation of the tire to coat the lubricant onto the tire's inner surface. While it is preferred to dispose the lubricant on the exposed surface of the supporting ring, the lubricant may also be disposed on the inner surface of the tire. Application of the lubricant to either of these surface will provide lubricant on the surface of the support ring and subsequently at the interface between the support ring and inner surface of the tire during a run flat situation.

The rubber composition for use in the tread supporting ring may be prepared in accordance with the teachings of U.S. Pat. Nos. 4,996,263 and 5,268,134 which are incorporated by reference in their entirety.

In one embodiment, the rubber composition alloy contains a rubber having nylon side chains grafted thereto. The rubber to which the nylon side chains are grafted typically contains repeat units which are derived from diene monomers, such as conjugated diene monomers and/or non-conjugated diene monomers. Such conjugated and non-conjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified to have nylon side chains include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, EPDM rubber and mixtures thereof. The preferred rubbers with nylon side chains are EPDM, natural rubber and synthetic polyisoprene.

The rubber having nylon side chains may contain no olefinic unsaturation or are olefinic saturated. One such example is the terpolymer of ethylene-ethylacrylate-maleic anhydride. The reaction functionality of these saturated rubbers may be a carboxylic acid moiety.

As will be discussed later, using a "functionalized" rubber is one method to produce the rubber having nylon side chains. The amount of reactive functionality present on the rubber may range from 0.25 percent by weight to 10 percent by weight of the rubber. Preferably, the range will be from 0.5 percent to 8 percent by weight of the rubber, with a range of from 0.6 percent to 3 percent by weight being the most preferred range.

Virtually any type of nylon can be utilized in preparing the rubber composition including the nylon which are side chains to the above rubbers. These nylons are polyamides which can be prepared by reacting diamines with dicarboxylic acids. The diamines and dicarboxylic acids which are utilized in preparing such nylons will generally contain from about 2 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

The nylons which are preferred for use in the alloy have melting points which are within the range of about 150° C. to about 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of about 175° C. to about 230° C. Some representative examples of such highly preferred nylons include nylon-6, nylon-8, nylon-9, nylon-10, nylon-11 and nylon-12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cycloctane, oxidized to cycloctanone, converted to the oxime with hydroxylamine, and subjected to the Beckmann rearrangement. Nylon-8 has a melting point of 200° C.

Copolyamides that contain repeating polymeric units of nylon-6 and nylon-6,6 may be used. One example of such copolyamide is Ultramid™ C commercially available from BASF and having a melt point of about 196° C.

Poly(ω-aminoundecanoic acid), known as nylon-11, can be prepared by the melt polymerization of (ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the ω-dodecanolactam. Nylon-12 has a melting point of 179° C. and is very highly preferred for use as the nylon in the process of this invention.

The nylons used in the rubber composition will typically have number average molecular weight which is within the range of about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with maleic anhydride and are accordingly preferred.

Nylons having acid capped end groups may also be used. When using such nylons, they may be reacted with a rubber containing an epoxide, glycidyl methacrylate or hydroxyl functionality. Examples of such rubbers include epoxidized polybutadiene and the terpolymer of ethylene-ethylacrylate-glycidylmethacrylate that is available from Atofina under the designation Lotader™ AX8900.

The rubber having nylon side chains may be prepared by simply reacting the maleic anhydride with the polydiene rubber and the nylon. This can be accomplished by simply mixing the maleic anhydride homogeneously throughout a blend of the polydiene rubber and the nylon and heating the maleic anhydride/nylon/polydiene rubber blend. The double bond in the maleic anhydride will react with the double bonds present in the polydiene rubber and the anhydride groups in the maleic anhydride will react with amine groups present in the nylon. This reaction causes nylon chains to be grafted onto the backbone of the polydiene rubber.

The reaction between the maleic anhydride, nylon and polydiene rubber can be carried out utilizing several satisfactory techniques. For instance, the maleic anhydride, nylon, and polydiene rubber can be simultaneously mixed together and heated to graft the nylon onto the rubber. In another scenario, the maleic anhydride can be reacted with the rubber to produce a rubber/maleic anhydride adduct and the rubber/maleic anhydride adduct can then be subsequently reacted with the nylon to produce the modified rubber of this invention. In still another technique of this invention, the maleic anhydride is first reacted with the nylon to produce a nylon/maleic anhydride adduct and the nylon/maleic anhydride adduct is subsequently reacted with the rubber. It is desirable to pre-react the maleic anhydride with the nylon in a first reaction step and to subsequently react the reaction product with the rubber because the rubber is subjected to elevated temperatures for a shorter duration of time and accordingly less degradation occurs.

The reaction between the reacting groups such as maleic anhydride and the nylon will typically be carried out at a temperature which is within the range of about 150° C. to about 300° C. It will preferably be carried out at a temperature which is within the range of about 165° C. to about 250° C. and will more preferably be conducted at a temperature which is within the range of about 180° C. to about 200° C. However, such reactions between the reacting groups, such as maleic anhydride and the nylon, will be carried out at a temperature which is at least as high as the melting point of the nylon. Reactions between rubber/maleic anhydride adducts and nylon will also be conducted within these temperature ranges.

The reactions between rubber and maleic anhydride and the reactions between rubber and nylon/maleic anhydride adducts will typically be carried out at a temperature which is within the range of about 150° C. to about 300° C. Such reactions will more typically be conducted at temperatures which are within the range of about 165° C. to about 250° C. The preferred temperature for such reactions depends upon the rubber being utilized and the reaction mechanism. For instance, most polydiene rubbers, such as high cis-1,4-polybutadiene, medium vinyl polybutadiene, SBR, synthetic polyisoprene, natural rubber, isoprene-butadiene rubber, nitrile rubber and isoprene-butadiene-styrene rubber, will react with maleic anhydride or nylon/maleic anhydride adducts at temperatures of greater than 180° C. by an electrocyclic reaction without the need to utilize a catalyst. The most preferred temperature for conducting such reactions is accordingly from about 180° C. to about 200° C. In cases where the nylon has a melting point of above 200° C. then the preferred reaction temperature is slightly above the melting point of the nylon. Such reactions can be carried out at lower temperatures by a free radical mechanism. However, free radicals lead to gel formation and such procedures are generally not desirable. In fact, it is beneficial to conduct such reactions which are carried out utilizing electrocyclic reaction mechanisms in the presence of free radical trapping antioxidants to inhibit gel formation. Some representative examples of free radical trapping antioxidants which can be used include (A) the reaction product of p-nonyl phenol, formaldehyde, and dodecane thiol-1 (Wingstay® K), and (B) 2-(2-hydroxy-3-t-butyl-5-methylbenzyl)$_4$-methyl-6-t-butyl phenyl methacrylate.

EPDM rubber will generally not react with maleic anhydride or nylon/maleic anhydride adducts at commercially acceptable reaction rates by electrocyclic reaction mechanisms. For this reason, it is desirable to utilize a free radical reaction in reacting EPDM with maleic anhydride or nylon/maleic anhydride adducts. Such reactions are generally conducted at a temperature which is within the range of about 180° C. to about 210° C. Such reactions are conducted in the presence of one or more free radical catalysts. Some representative examples of free radical initiators which can be used include various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(1-butylperoxy)butyrate, 1,1-di-(t-butylperoxy) cyclohexane, and the like. Mercapto benzothiazyl disulfide is a preferred free radical catalyst.

The maleic anhydride is mixed throughout the rubber and/or the nylon utilizing conventional mixing procedures. For example, the mixing can be carried out in a Banbury® mixer or a mill mixer or continuous mixer such as a twin-screw extruder. The amount of maleic anhydride utilized will typically be within the range of about 0.1 phr to about 20 phr. In most cases, it will be preferred to utilize from about 0.5 phr to 3 phr. It is generally most preferred to utilize from about 0.8 phr to about 2 phr of the maleic anhydride.

An alternative to using free maleic anhydride as discussed above is using a maleated or maleanized rubber For example, maleated EPDM is commercially available from Uniroyal under the designation Royaltuff™ 490 or 498.

In the instance when one uses a maleated rubber, one can avoid handling free maleic anhydride. One can simply mix the maleated rubber, nylon and first rubber, in a conventional extruder to form the rubber composition.

The rubber composition is comprised of from 5 to 35 phr of the rubber having nylon side chains grafted thereto. Preferably, the rubber having nylon side chains grafted thereto comprises of from 14 to 25 phr of the rubber composition.

The other critical component in the composition is the nylon. The nylon may comprise of from 1 to 40 phr of the composition. Preferably, from 8 to 25 phr of the composition. This component refers to the unreacted nylon or non-grafted nylon in the composition.

The amount of nylon in the rubber composition may vary depending on the viscosities of the nylon and rubbers used. Preferably, the rubber composition will have a Mooney viscosity (ML 1+4 at 100° C.) in the range of from about 25 to about 110 in order to mix in conventional rubber processing equipment below the melting point of the nylon.

As indicated above, from 65 to 95 phr is the first rubber. Preferably, from 75 to 86 phr of the rubber composition is the first rubber. The first rubber may be the same or different from that used to form the rubber having nylon side chains grafted thereto.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the same as listed above for use as the rubber having nylon side chains, as well as tin-coupled rubbers. Preferably, the first rubber is different from the rubber used as the rubber having nylon side chains. In this embodiment, it may be preferred to use a rubber having a lower degree of unsaturation as the rubber having nylon side chains than used in the first rubber.

In one aspect the first rubber to be combined with the rubber having nylon side chains and nylon is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprenelbutadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) can be prepared, for example, by organic solution polymerization of 1,3-butadiene. The BR may be conveniently characterized, for example, by having at least a 90 percent cis 1,4-content.

When mixing the first rubber, rubber having nylon side chains and nylon, it is preferred to use a twin-screw extruder. It is also preferred that the rubbers are in a powder, crumb rubber or pellet form for ease in feeding the extruder. When the rubbers are in bale form, it is preferred that the bale rubber be converted to a crumb or ground form of rubber that is partitioned with a partitioning agent such as silica, talc, $CaCO_3$ or clay to keep the rubber free flowing without massing back together. The nylon is generally fed in the main hopper for melting along the length of the extruder. The rubber containing the reactive functionality, such as maleic anhydride, and the first rubber may be fed in the main hopper or in a side feeder which is located downstream in an extruder. Such compounding methods are known to the skilled in the art.

The term "phr" as used herein, and according to conventional practice, refers to "parts by weight of a respective material per 100 parts by weight of rubber, or elastomer."

In addition to the first rubber, rubber having nylon side chains and nylon, conventional fillers may be also present. The amount of such conventional fillers may range from 10 to 90 phr. Preferably, the filler is present in an amount ranging from 20 to 50 phr.

When using large levels of conventional fillers with a high specific gravity such as carbon black and silica, the weight of the vulcanized rubber ring is increased leading to increased fuel consumption. Therefore, it is necessary that a substantial portion of conventional fillers is substituted with a low specific gravity and high melting point thermoplastic, most preferably nylon, to provide a lighter weight ring and with a lower heat build-up, when compared with the conventional fillers used in reinforced vulcanized rubber ring.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in *The Journal of the American Chemical Society,* Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z 1165 MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

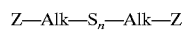

in which Z is selected from the group consisting of

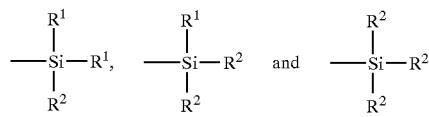

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides The most preferred compounds are 3,3'-bis (triethoxysilylpropyl) disulfide and 3,3'-bis (triethoxysilylpropyl) tetrasulfide. Therefore as to formula 15, preferably Z is

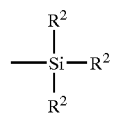

where R$^2$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula 15 in a rubber composition will vary depending on the level of other additives that are used. Generally speaking, the amount of the compound of formula 15 will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide, morpholine disulfide and sulfur olefin adducts. Preferably, the sulfur donor is morpholine disulfide and/or elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, styrenated phenols, butylated octylated phenol, butylated di(dimethylbenzyl) phenol, p-phenylenediamines, butylated reaction products of p-cresol and dicyclopentadiene (DCPD), polyphenolic antioxidants, hydroquinone derivatives, quinoline, diphenylene antioxidants and thioester antioxidants and the like and their blends. Some representative trade names of such products are Wingstay® S, Wingstay® T, Wingstay® C, Wingstay® 100, Wingstay® 100 AZ, Wingstay® 200, Wingstay® L or LHLS, Wingstay® K, Wingstay® 29 and Wingstay® SN-1 of The Goodyear Tire & Rubber Company and the like from Ciba Geigy or Great Lakes Chemical Company or Flexsys. Additional examples are disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition with any of the above conventional additives can be accomplished by methods known to those having skill in the rubber mixing art. The mixing may be accomplished in a conventional extruder or Banbury™ depending on the ratios of the ingredients. In a Banbury™, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber composition with the conventional additives are mixed in one or more non-productive mix stages. The terms "non-productive" and "productive" mix stages are well known to those having skill in the rubber mixing art. The rubber/nylon alloy may be added as a separate ingredient or in the form of a masterbatch. The rubber composition containing the rubber/nylon alloy, as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition containing the rubber and rubber/nylon alloy may be formed in the shape of the tread supporting ring by injection molding, extrusion or calendering.

The pneumatic tire of the present invention may be a passenger tire, aircraft tire, agricultural, earthmover, motorcycle, off-the-road, truck tire and the like. Preferably, the tire is passenger or truck tire. The tire may also be a radial or bias, with a radial being preferred.

Vulcanization of the tread supporting ring of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

EXAMPLE I

In this example, a high temperature silicone grease of the present invention is compared to a standard silicone grease used in a PAX run flat tire system. The friction force was measured by sliding a tire innerliner compound against a PAX insert in the presence of a lubricant. The friction force was measured at two temperatures, 25° C. and 125° C., for each of the two lubricants. The results are shown in Table 1, with values reported as the average of three measurements for each condition.

The storage modulus, G' was measured at 100° C. for each lubricant using a Rheometric Scientific ARES rotational rheometer. The results are shown in Table 2.

TABLE 1

| Sample | 1 | Control 2 |
|---|---|---|
| Friction Force at 25° C., N | 2.05 | 3.01 |
| Friction Force at 125° C., N | 1.98 | 2.93 |

Sample 1: Dow Corning High Vacuum Grease
Sample 2: Standard PAX silicone grease from Michelin

TABLE 2

| Sample Frequency, radian/sec | 1 | Control 2 |
|---|---|---|
| | G' (dyn/cm$^2$) | |
| 0.1 | 40413 | 7070 |
| 0.15849 | 56329 | 7910 |
| 0.25119 | 68586 | 8298 |
| 0.39811 | 83507 | 8569 |
| 0.63096 | 90713 | 8682 |
| 1 | 94622 | 8827 |
| 1.58489 | 98393 | 9015 |
| 2.51189 | 102000 | 9120 |
| 3.98107 | 106000 | 9298 |
| 6.30957 | 109000 | 9460 |
| 10 | 112000 | 9649 |
| 15.8489 | 115000 | 9861 |
| 25.1189 | 118000 | 10105 |
| 39.8107 | 121000 | 10387 |
| 63.0957 | 125000 | 10750 |
| 100 | 130000 | 11194 |

Surprisingly and unexpectedly, the high temperature silicone grease of the present invention (Sample 1) shows about a 33 percent lower friction force that the standard lubricant (Sample 2) at both temperatures measured. The friction force measured for Sample 1 is significantly lower than for Sample 2, and the use of Sample 1 would result in clearly desirable reduction in friction and subsequent heat generation in a run flat tire. Also surprisingly and unexpectedly, Sample 1 shows a much higher storage modulus than Sample 2. The higher storage modulus of Sample 1 is advantageous in that as speed increases, the storage modulus of Sample 1 increases which enables the lubricant to maintain higher film strength and thereby better function as a lubricant at high temperature.

While certain representative embodiments and details have been shown for the purpose of illustrating the invention, it will be apparent to those skilled in this art that various changes and modifications may be made therein without departing from the spirit or scope of the invention.

What is claimed is:

1. A method of lubricating the interface between a supporting ring and inner surface of a tire for use with a rim for a tire having two beads, comprising the step of providing a lubricant at said interface, said lubricant comprising at least 60 percent by weight of polydimethylsiloxane, from about 7 to about 13 weight percent of amorphous silica, and from about 7 to about 13 weight percent of hydroxy-terminated dimethyl siloxane; wherein said lubricant has a storage modulus G' in a range of about 40,000 to about 130,000 dyne/cm$_2$, measured in a frequency range of about 0.1 to about 100 radians/second at 100° C.

2. The method of claim 1, wherein said lubricant is disposed on an exposed surface of said supporting ring.

3. The method of claim 1, wherein said lubricant is disposed on an inner surface of said tire.

4. The method of claim 1, wherein said tire is selected from passenger tires, aircraft tires, agricultural tires, earthmover tires, motorcycle tires, off-the-road tires, truck tires.

5. The method of claim 2 wherein said lubricant is provided as a film.

6. The method of claim 2 wherein said lubricant is disposed in a container for the lubricant which is released by an activation means by the deflation of the tire.

7. The method of claim 3 wherein said lubricant is provided as a film.

8. The method of claim 3 wherein said lubricant is disposed in a container for the lubricant which is released by an activation means by the deflation of the tire.

* * * * *